(12) United States Patent
Freisler et al.

(10) Patent No.: US 11,679,734 B2
(45) Date of Patent: Jun. 20, 2023

(54) FRONTAL AIRBAG

(71) Applicants:ZF AUTOMOTIVE GERMANY GMBH, Alfdorf (DE); AUDI AG, Ingolstadt (DE)

(72) Inventors: Werner Freisler, Schwäbisch Gmünd (DE); Simon Schmid, Heuchlingen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/047,755

(22) PCT Filed: Apr. 18, 2019

(86) PCT No.: PCT/EP2019/060050
§ 371 (c)(1),
(2) Date: Oct. 15, 2020

(87) PCT Pub. No.: WO2019/202060
PCT Pub. Date: Oct. 24, 2019

(65) Prior Publication Data
US 2021/0107427 A1  Apr. 15, 2021

(30) Foreign Application Priority Data
Apr. 19, 2018  (DE) ...................... 10 2018 109 382.9

(51) Int. Cl.
*B60R 21/2338* (2011.01)
*B60R 21/231* (2011.01)
(Continued)

(52) U.S. Cl.
CPC ........ *B60R 21/2338* (2013.01); *B60R 21/205* (2013.01); *B60R 21/231* (2013.01);
(Continued)

(58) Field of Classification Search
CPC .......... B60R 2021/23384; B60R 2021/23382; B60R 2021/0009; B60R 2021/0048;
(Continued)

(56) References Cited

U.S. PATENT DOCUMENTS 6,308,983 B1\* 10/2001 Sinnhuber ......... B60R 21/01504
280/743.1
7,552,942 B2\*  6/2009 Fischer ............... B60R 21/2338
280/739
(Continued)

FOREIGN PATENT DOCUMENTS

DE  102007032763      1/2008
DE  102007032763 A1\*  1/2008 ........... B60R 21/233

*Primary Examiner* — Keith J Frisby
(74) *Attorney, Agent, or Firm* — Tarolli, Sundheim, Covell & Tummino L.L.P.

(57) ABSTRACT

A frontal airbag for vehicle occupants comprises a contact panel (26) facing the vehicle occupant in the inflated state. Inside the airbag tension means (30, 30') which restrain portions of the contact panel (26) in the inflated state of the frontal airbag (10) are arranged on the contact panel (26) so that, in the mounted and inflated state, the contact panel (26) forms plural indentations (32) extending vertically from the view of the associated occupant. The frontal airbag (10) optionally may take a first completely inflated state and a second completely inflated state with a larger airbag volume than in the first state, wherein a release device (40) is assigned to at least several of the tension means (30, 30') and, when the release device is not activated, the frontal airbag (10) only reaches the first state and, when the release device (40) is activated, the contact panel (26) bulges in the area of the released tension means (30, 30') further toward the occupant so as to enable the second state.

25 Claims, 4 Drawing Sheets

(51) Int. Cl.
  *B60R 21/205* (2011.01)
  *B60R 21/235* (2006.01)
  *B60R 21/00* (2006.01)
  *B60R 21/233* (2006.01)
  *B60R 21/01* (2006.01)

(52) U.S. Cl.
  CPC .... *B60R 21/235* (2013.01); *B60R 2021/0009* (2013.01); *B60R 2021/0048* (2013.01); *B60R 2021/01225* (2013.01); *B60R 2021/01238* (2013.01); *B60R 2021/23308* (2013.01); *B60R 2021/23384* (2013.01)

(58) Field of Classification Search
  CPC .. B60R 2021/0004; B60R 2021/01238; B60R 2021/01225; B60R 21/2338; B60R 21/231; B60R 21/205
  USPC ............. 280/743.2, 743.1, 732, 730.1, 728.1
  See application file for complete search history.

(56) References Cited

U.S. PATENT DOCUMENTS

| | | |
|---|---|---|
| 10,632,957 B2 | 4/2020 | Bausch et al. |
| 2004/0046736 A1 | 3/2004 | Pryor et al. |
| 2010/0045007 A1 | 2/2010 | Bergstrom et al. |
| 2015/0307052 A1 | 10/2015 | Jaradi et al. |
| 2020/0039460 A1 | 2/2020 | Zink et al. |

* cited by examiner

FRONTAL AIRBAG

RELATED APPLICATIONS

This application corresponds to PCT/EP2019/060050, filed Apr. 18, 2019, which claims the benefit of German Application No. 10 2018 109 382.9, filed Apr. 19, 2018, the subject matter of which are incorporated herein by reference in their entirety.

BACKGROUND OF THE INVENTION

The invention relates to a frontal airbag for vehicle occupants, especially a passenger airbag, comprising a contact panel facing the vehicle occupant in the inflated state and including an upper edge, a lower edge and two lateral edges, wherein inside the airbag tension means which restrain portions of the contact panel in the inflated state of the airbag are disposed on the contact panel.

An airbag of this type is known from DE 10 2015 004 956 A1. In this airbag, the beads formed by the indentations are differently large so that, for example, the side beads extend more closely to the occupant than central beads in order to retain the vehicle occupant in the event of an oblique collision.

SUMMARY OF THE INVENTION

It is the object of the invention to further improve the known frontal airbag.

This object is achieved by a frontal airbag for vehicle occupants, especially a passenger airbag, in which the airbag has a contact panel facing the vehicle occupant in the inflated state and including an upper edge, a lower edge and two lateral edges, wherein inside the airbag tension means which restrain portions of the contact panel in the inflated state of the airbag are disposed on the contact panel so that in the mounted and inflated state the contact panel forms several indentations extending vertically from the view of the associated occupant. The frontal airbag takes a first completely inflated state and a second completely inflated state having a larger airbag volume than in the first state, wherein a release device is assigned to at least several of the tension means and, when the release device is not activated, the frontal airbag only reaches the first state and, when the release device is activated, the contact panel bulges in the area of the released tension means further toward the occupant to enable the second state. In the frontal airbag according to the invention, in the mounted and inflated state plural indentations extending vertically from the view of the associated occupant are formed on the contact panel both in the first state and in the second state so that the contact panel includes plural vertically extending indentations even in the second state. In this way, when the occupant impacts the contact panel, the contact panel can also be laterally moved both in the first state and in the second state, as additional airbag panel material is made available by the plural indentations and the beads formed between the indentations.

As has been found by recent examinations, in the case of an impact of the occupant' head, the indentations offer the possibility of the contact panel adjacent to the contact area being entrained in the adjacent areas by the immersion of the head, whereas in the previous frontal airbags which substantially have no distinct indentations the head upon impacting is "retained" at the substantially hardly curved surface of the airbag, thus causing the head to be rotated. This is because the hardly curved surface is not capable of being laterally moved along with the head obliquely impacting thereon. The invention allows the area of the contact panel on which the occupant impacts to be laterally moved along, because additional airbag wall material is available, causing the rotational movement of the head to be reduced. The release device either allows the at least one tension means to hold the contact panel more closely toward the vehicle front end so that the airbag has a smaller volume, or, when the release device is activated, the contact panel can deploy further in the direction of the tail of the vehicle and thus further toward the occupant so that the airbag has a larger volume, wherein, in both states, the contact panel includes the plural indentations extending vertically from the view of the associated occupant.

The larger volume is relevant to safety especially when the occupant is seated extremely far backward or the seat back is strongly reclined, which will play a more important role, for example, during future autonomous driving. Then the driver or the passenger will take a seat further backward to adopt a more comfortable position or will further recline the seat back. In such comfort position, the frontal airbag according to the invention offers further optimized protection due to the optionally enlarged volume.

The indentations and the beads between the indentations also extend preferably vertically and/or in parallel to one another, for example over the entire height of the airbag. Alternatively, the indentations and the beads between the indentations may only extend over a subarea of the height of the airbag. These indications, too, refer to the mounted and inflated airbag again. The plural indentations and the beads between the indentations are especially arranged in the area of the contact panel only and, consequently, on the side of the airbag associated with the occupant.

The at least one tension means can either be released from an anchorage or can be destroyed via the release device. As an alternative to this, the release device causes the length of the tension means to be increased.

The release device comprises or is formed by an electrically activatable drive, for example a pyrotechnic drive that is electrically initiated.

It is also possible to assign one release device to plural tension means so as to jointly release the latter. This helps save the costs for additional release devices.

Accordingly, inside the airbag, for example plural tension means extending from the contact panel and each being assigned to one indentation can be combined into one tension means. Said tension means then extends toward the rear side of the airbag. The release device acts on said single tension means. In other words, in the deployed state of the airbag, the tension means extend fork-shaped toward the rear panel so as to then join into one tension means.

Preferably, the contact panel is composed of plural interconnected strip-shaped cut parts extending vertically in the inflated state of the frontal airbag. Said cut parts are connected, especially stitched to each other, at their longitudinal edges. The tension means may equally be attached to the contact panel in the connection area, for example fastened to the contact panel by the same seam which secures the cut parts to each other.

At least several, preferably the central, cut parts are vertically longer than wide, i.e. they are strip-shaped. This definition, too, refers to the mounted and inflated state of the airbag.

Preferably, each cut part defines a bead of the airbag.

In order to facilitate manufacture of the airbag and to provide as few seams as possible, several and preferably all of the cut parts can extend continuously from the upper edge to the lower edge of the airbag. In this context, it is emphasized that, of course, the upper and lower edges as well as the lateral edges of the contact panel cannot be defined as an edged end of the airbag in the area of the contact panel, for the edges merge rounded into a rear panel to which the contact panel is connected. The upper and lower edges as well as the lateral edges always refer to the mounted and inflated state in the view of the associated occupant.

At least several, preferably all of the cut parts, however, can be fastened to a rear panel in the area of the upper and lower edges. The cut parts thus jointly form the contact panel, whereas they need not form the rear panel. Hence, in terms of geometry, the contact panel and the rear panel can be formed independently of each other.

In another embodiment, the contact panel made from the cut parts is arranged in a dedicated recess of a front panel of the airbag. The edges of the contact panel made from the cut parts are especially fastened to the front panel. In the first state, the contact panel is formed by the cut parts and the front panel. In the second state in which the tension means are released by the release device, the contact panel is formed substantially only by the cut parts which then are deployed further toward the occupant. In such embodiment, the cut parts in the second state configure an expansion of the airbag which takes especially the shape of a packet-like extension "attached" to the front panel. The contact panel includes, even in the second state, the indentations and the beads between the indentations. Furthermore, by varying the size of the cut parts, the depth of the "attached" packet-like extension and thus the volume and the size of the frontal airbag in the second state can be easily varied.

In order to increase the optional expansion of the frontal airbag in the vehicle longitudinal direction in the second state, the edges of the contact panel made from the cut parts can be secured to at least one additional panel element. The at least one additional panel element in such embodiment is fastened, preferably with the edge facing the contact panel, to the front panel and/or the rear panel of the frontal airbag. Tension means that can be released by the release device may equally be disposed on the at least one additional panel element.

By varying the size of such additional panel element, the depth and thus the volume of the airbag in the second state can be easily varied and, consequently, such airbag can be easily adapted, for example, to differing seat adjusting fields of the vehicle seat in which the vehicle seat is adjustable differently far backward, for example, depending on the embodiment. Especially the depth of the frontal airbag which describes the expansion of the frontal airbag toward the occupant can be increased in the second state with a smaller additional airbag volume than this is the case with a prior art frontal airbag.

As for varying the size of the frontal airbag, merely the cut parts and/or the additional panel elements have to be adapted rather than the rear panel, the size of the frontal airbag can be easily adapted in the second state without having to influence/adapt the entire airbag geometry.

It is of advantage, for forming the indentations, when at least several, preferably all of the cut parts have an upper end and a lower end which are horizontally narrower than the central area located between the ends. In order to define this geometry of the cut parts, they are flatly spread in the non-connected state, the upper edge facing upward and the lower edge facing downward.

In this state, it is also defined that at least several, preferably all of the cut parts bulge laterally outward in the central area. In the edge area of the bulges, neighboring cut parts are connected, preferably stitched, to each other. In this way, additional material is provided by which the indentations are carried out.

The indentations have different depths vis-à-vis an envelope of the contact panel. Preferably, the indentations are configured so that, starting from the upper and lower ends, they are increasingly deeper in the central area.

For implementing the afore-mentioned advantages for the restraint by additional airbag material at the contact panel even in the second state, the contact panel optionally includes vertically extending indentations even in the second state.

Said vertically extending indentations in the second state are formed especially at seams between strip-shaped and vertically extending cut parts of the contact panel. The indentations may also be produced by the cutting shape. As an alternative to this, even in the second state the indentations can be obtained by tension means.

In the case of oblique collision, it may be advantageous when, in the inflated and mounted state of the airbag, the contact panel forms a vertically extending elongate bead at one of its lateral edges the horizontal width of which is larger than that of the other beads formed between neighboring indentations. Said elongate additional-wide bead is preferably delimited against the remaining contact panel by tension means designed to include no release device so that the additional-wide lateral bead always is the same size.

The rear panel may be a one-piece cut part.

The at least one tension means may be designed and coupled to the release device so that, upon release, it has a larger active length and, in the second state, continues to be subjected to tensile load so as to produce at least one indentation at the contact panel.

The tension means are especially tethers. Said tethers may be secured to the rear panel or to a reinforcing layer in the area of the inflation orifice or the mounting of the airbag on the module or on the inflator.

The frontal airbag according to the invention includes at least two, in particular three indentations and, correspondingly, at least three, preferably four beads which extend substantially vertically.

The beads can, based on the mounted and inflated state, be different in width, especially the lateral cut parts may result in wider beads than the central cut parts.

BRIEF DESCRIPTION OF THE DRAWINGS

Further advantages and features of the invention will be evident from the following description and from the following drawings that are referred to, wherein.

DESCRIPTION

Figure 1:
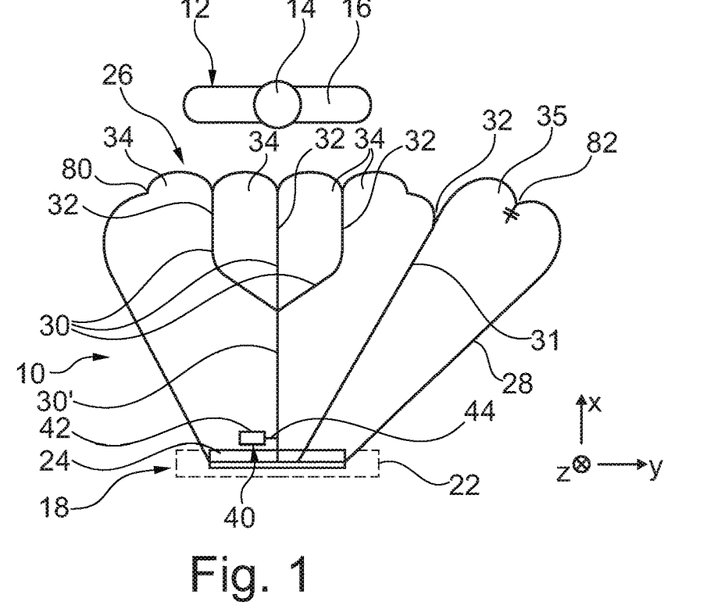
FIG. 1 shows a simplified schematic top view onto a horizontally cut frontal airbag of the invention according to a first embodiment in the mounted and inflated first state.

FIG. 1 illustrates a frontal airbag 10, more exactly a front passenger airbag. The airbag 10 is shown, in the mounted and completely inflated state, from above in a horizontal section. The vehicle longitudinal direction, in the driving direction, has the coordinate x and the vehicle transverse direction, in the horizontal direction, has the coordinate y. The vertical direction is the direction with the coordinate z.

The occupant 12 is shown with his/her head 14 and torso 16.

The airbag 10 is part of an airbag module 18 shown symbolized in broken lines which is mounted in or below the instrument panel and exits the latter. The module housing is denoted with the reference numeral 22. In the module housing an inflator 24 by which the airbag 10 is inflated is accommodated.

The airbag 10 is completely accommodated in the module housing 22 in the folded state.

It is emphasized that the inflator 24 may be a single-stage or multi-stage inflator comprising one or more discharge openings spaced apart from each other. Alternatively, also plural inflators 24 are possible.

The airbag 10 includes an outer panel having plural portions and areas, with the area facing the vehicle occupant 12 being referred to as contact panel 26. A panel opposed to the contact panel 26 is the rear panel 28. Said rear panel 28 faces the instrument panel and the windscreen.

The rear panel 28 is the panel which is fastened on the airbag module side and via which the airbag 10 is locked on the vehicle in the inflated state.

Plural tension means 30, 31 in the form of tethers are present inside the airbag 10. Said tension means 30, 31 are secured at one end to the rear panel 28 or else to the module housing 22 or a part connected to the latter.

The opposed end of each tension means 30 is secured to the contact panel 26 and prevents the contact panel 26 in the secured area from being moved unhindered toward the occupant 12 during inflation. The tension means 30, 31 help form plural indentations 32 and convex beads 34, 35 facing the occupant and being formed between the indentations 32.

Said beads 34, 35 extend substantially vertically, relating to the mounted and inflated state. Depending on the airbag material available between neighboring indentations 32, the extension for the beads 34, 35 shown in FIG. 1 and curved in cross-section can result. If there is provided more or less airbag material, the beads 34, 35 can be bulged more or less strongly.

In this case, a larger bead 35 is the left bead 35 from the view of the occupant 12 which also is the bead 35 of the airbag 10 closing off toward the driver seated on the left side, which bead is laterally restricted and formed by the tension means 31.

Optionally, but not mandatory, said left bead 35, and more exactly the bead 35 toward the neighboring vehicle occupant, may extend somewhat further in the x direction and thus may have a larger horizontal width than the remaining beads 34 so as to provide an additional barrier against lateral slide-off.

As is further evident from FIG. 1, the tension means 30 partially converge toward their module-side end and are combined to form a joint tension means 30', wherein said joint tension means 30' may be, for example, a separate piece or may also be, for example, the central tension means 30 to which the outer tension means 30 are attached. Any type of joint tension means 30' is possible here.

In the area of the module-side securing of the tension means 30' an electrically activatable release device 40 is provided. Said release device 40 may include an electrically activatable drive 42, e.g. a pyrotechnic drive, that is activated by electric signals from a vehicle controller or an airbag controller. In the present case, the drive 42 actuates a cutting unit 44 which, when activated, can destroy the tension means 30' in the area of the module housing 22. In the embodiment according to FIGS. 1 and 2, one single release device 40 is assigned to all tension means 30 for jointly releasing them. Of course, it would also be possible to assign separate release devices to individual tension means 30.

The first state shown in FIG. 1 with the non-activated release device 40 is adopted in a case of restraint, if the occupant 12 is normally positioned, i.e. if he/she is not seated too remote from the instrument panel and the seat back is not fully reclined.

Figure 2:
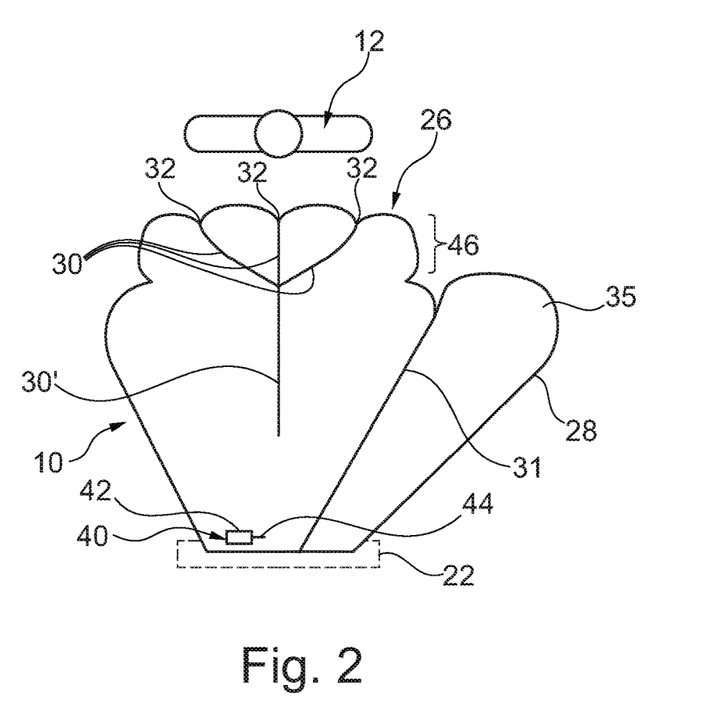
FIG. 2 shows a simplified schematic top view onto the horizontally cut frontal airbag of the invention according to FIG. 1 in the mounted and inflated second state.

However, if the occupant 12 is seated relatively remote from the instrument panel and/or has largely reclined his/her seat back, for example during autonomous driving, the release device 40 is activated simultaneously with, immediately before or immediately after triggering the inflator 24 so that the module-side securing of all tethers 30 gets lost. Then the airbag 10 has a larger volume, as illustrated in FIG. 2.

This larger volume ensures the contact panel 26 to be shifted toward the vehicle tail. The indentations 32 according to FIG. 1 are at least partially lost, for the airbag material provided by the indentations 32 can bulge toward the occupant. The comparison of FIGS. 1 and 2 shows that a packet-like extension 46 is formed which shifts the contact panel 26 except for the bead 35 further in the direction of the vehicle tail.

As an option, also in the second state, the contact panel 26 may include indentations 32 which are produced by the cutting of the airbag 10, and possibly also by tethers 30 coupled to each other.

Figure 3:
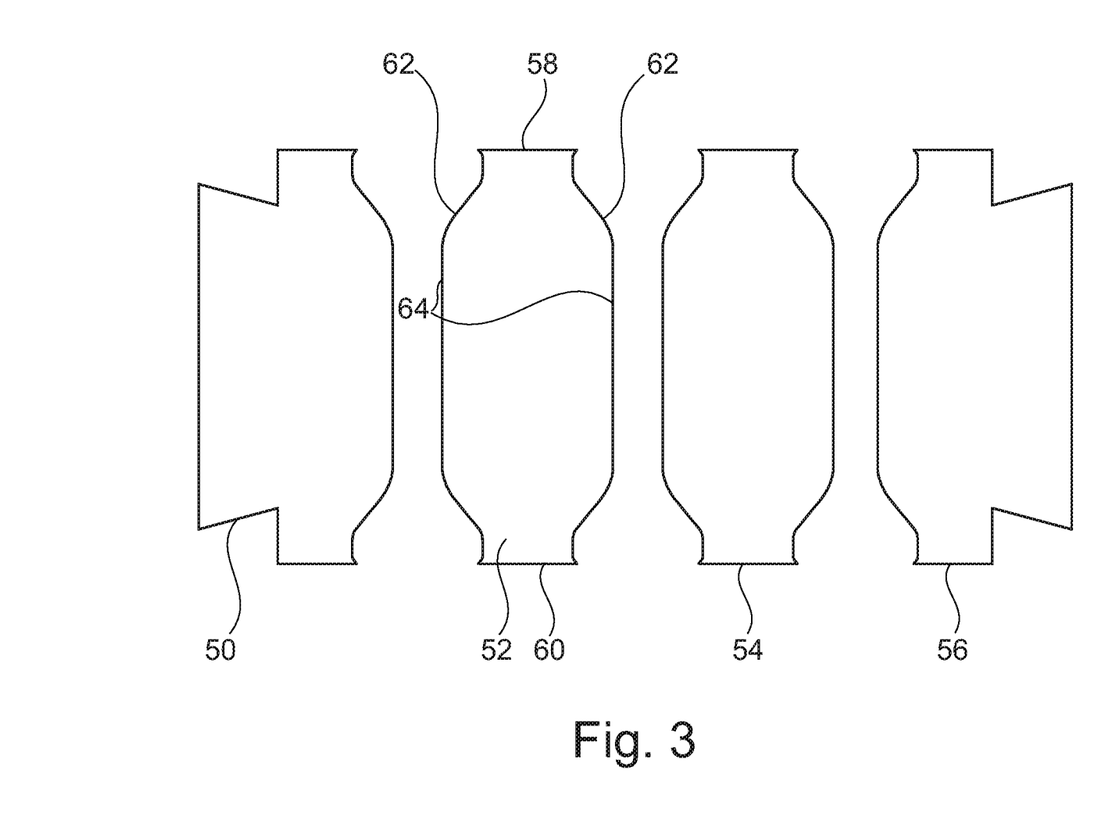
FIG. 3 shows cut parts of the contact panel and the rear panel of the airbag of the invention according to FIGS. 1 and 2.

FIG. 3 illustrates the cut parts 50, 52, 54 and 56 that define the packet-like extension 46. All cut parts 50-56 are made from an airbag fabric material and take an elongate strip shape. Said elongate shape means that, in the mounted and inflated state of the airbag 10, the cut parts 50-56 have a larger dimension in the z direction than in the y direction.

The cut parts 50-56 further include, relating to the mounted and inflated state of the airbag 10, upper and lower edges 58 and 60, said edges 58, 60 being defined by the upper and lower ends of the respective cut part, as well as longitudinal edges 62 at which each of the cut parts 50-56 is wider than in the area of the upper and lower edges 58, 60. In the so-called central area between the upper and lower ends bulges 64 are formed, which, for the sake of clarity, are provided with reference numerals only at the cut part 52.

The additional fabric material required for the indentations 32 is made available by said bulges 64. The neighboring cut parts 50-56 are stitched to each other at the longitudinal edges 62. For the bead 35 an additional cut part (not shown) is provided which is stitched to the cut part 56.

The rear panel 28 is formed by a one-piece cut part.

The tethers 30 are secured to the contact panel 26 preferably by the same seam that is also used to stitch the neighboring longitudinal edges 62 into each other.

The rear panel 28 produces sort of a bag-shaped geometry, the "bag" being open to the front side and being closed by the contact panel 26. Thus, the contact panel 26 has upper and lower edges which are composed of the edges 58, 60 of the cut parts 50-56 and of the cut part for the bead 35. Further, the contact panel 26 includes lateral edges 80, 82 that are formed by the opposed longitudinal edges of the cut part 50 and of the cut part for the bead 35.

The cut parts 50-56, just as the indentations 32, extend, in the inflated state of the airbag 10, vertically continuously and over the entire front side of the airbag, i.e. from an upper edge of the "bag" to an opposite lower edge. The edges 58, 60 are stitched to the upper and lower edges of the "bag". The lateral cut parts 50 as well as the cut part for the bead 35 are stitched to the lateral edges of the "bag" at their opposed longitudinal edges.

Figure 4:
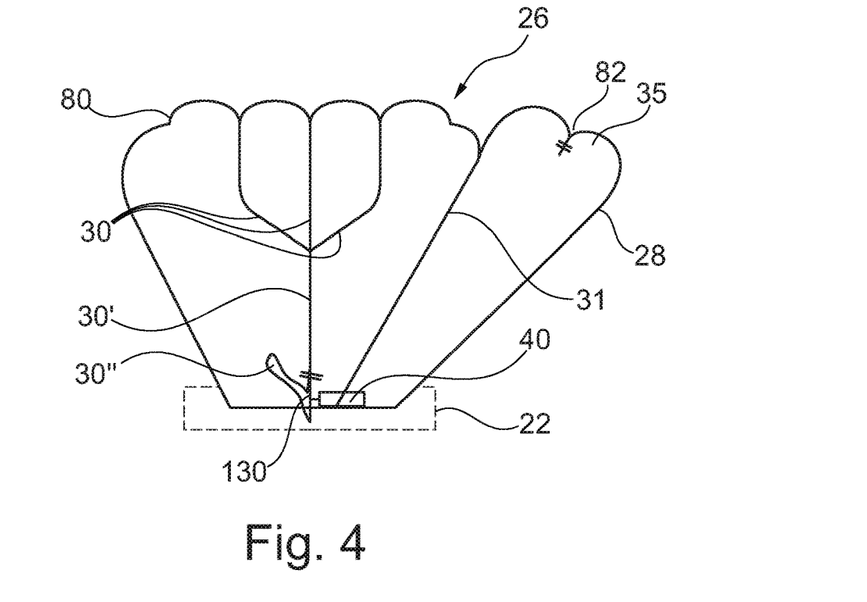
FIG. 4 shows a simplified schematic top view onto a horizontally cut frontal airbag of the invention according to a second embodiment in the mounted and inflated first state.
Figure 5:
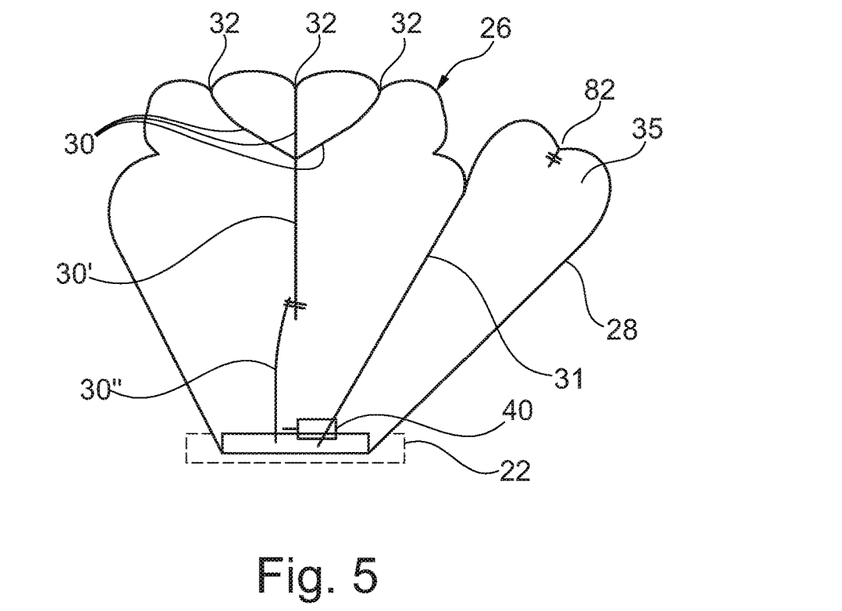
FIG. 5 shows a simplified schematic top view onto the horizontally cut frontal airbag of the invention according to FIG. 4 in the mounted and inflated second state.

The embodiment according to FIGS. 4 and 5 corresponds, except for the following difference, to the embodiment according to FIGS. 1 and 2 so that the already introduced reference numerals can be maintained, and, in the following, only the differences shall be discussed.

The difference in this embodiment consists in the fact that, in contrast to the first embodiment, the tension means 30' is not completely released on the module side, but that rather the active length of the tension means 30' is increased by activating the release device 40. This means that, in the second state, the tension means 30' is still subjected to tensile load so that the indentations 32 are deeper than in the first embodiment.

The tension means 30' is of multi-part design, for example, comprising a bridging portion 30'' which only in the second state is subjected to tensile load and in the first state forms a loop. The portion 130 bridged by the loop is then released, e.g. severed, on the module side by the release device 40.

Of course, the release device may quite generally consist in releasing or destroying the tension means 30'. For example, the tension means 30' could include, on the module side, a loop through which a bolt extends that is destroyed or displaced by the release device 40 so that the module-side securing is abruptly eliminated.

Figure 6:
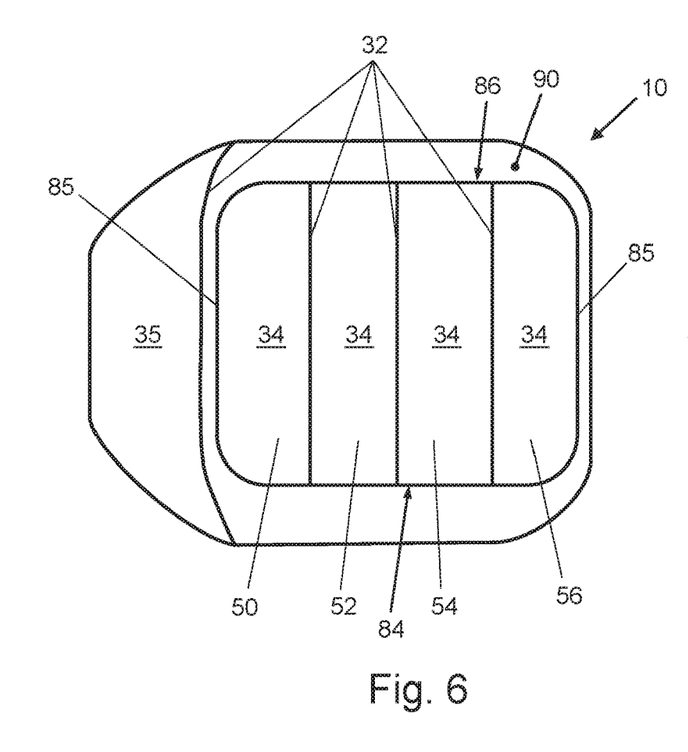
FIG. 6 shows a simplified schematic front view onto a frontal airbag of the invention according to a third embodiment in an inflated state.
Figure 7:
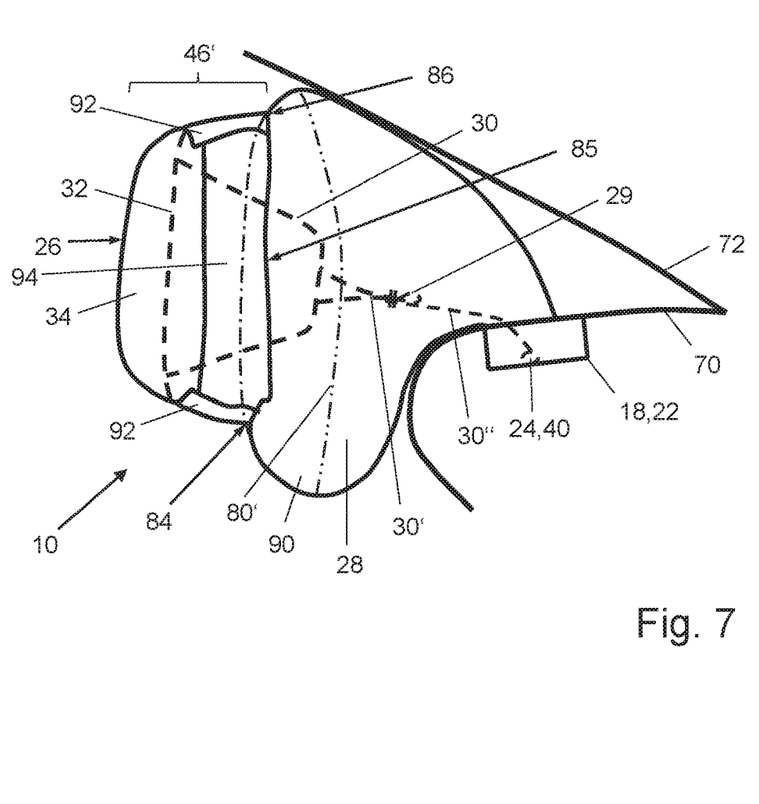
FIG. 7 shows a simplified schematic side view of the frontal airbag according to FIG. 6 in a mounted and inflated second state.

FIGS. 6 and 7 illustrate a third embodiment of the frontal airbag 10. The embodiment according to FIGS. 6 and 7 differs from the embodiment according to FIGS. 1 and 2 as well as 4 and 5 by few features only so that the already introduced reference numerals can be maintained and, in the following, only the differences shall be discussed.

In contrast to the first and second embodiments, the cut parts 50-56 do not extend from an upper edge to a lower edge of the airbag 10. From FIG. 6 illustrating a front view onto the airbag 10 in the vehicle longitudinal direction x, i.e. from the view of a vehicle occupant onto the airbag 10, it results that the cut parts extend from a lower edge 84 to an upper edge 86 of a recess of the front panel 90. The contact panel 26 is formed in the first state by the cut parts 50-56 and the front panel 90. In the shown embodiment, as is evident from FIG. 7, the front panel 90 is connected, especially stitched to the rear panel 28 at the lateral edge 80'.

FIG. 7 illustrates a lateral view onto the airbag 10 in the mounted and inflated second state in which the airbag 10 is disposed between the instrument panel 70 and the windscreen 72.

The contact panel 26 is formed by the beads 34 of the cut parts 50-56. In order to enable the packet-like extension 46' to further expand toward an occupant, the airbag 10 comprises additional panel elements 92 and 94. The edges of the contact panel 26 consisting of the cut parts 50-56 are fastened to the additional panel elements 92-94 in this embodiment. The additional panel elements 92-94 are fastened, in turn, to the lateral edges 85 as well as to the lower edge 84 and the upper edge 86 of the recess in the front panel 90. Such packet-like extension 46' helps increase the expansion of the airbag 10 in the second state, wherein at the same time the required additional volume can be kept low as compared to a prior art airbag. Especially, the expansion of the airbag 10 can be easily varied by adapting the additional panel elements 92, 94.

In this embodiment, the tension means 30' is not completely released on the module side, either, but by activating the release device 40 the active length of the tension means 30' has been increased. This means that, in the second state, the tension means 30' continues to be subjected to tensile load so that, even in this embodiment, the indentations 32 are deeper than in the first embodiment.

The tension means 30' is equally of multi-part design, comprising a bridging portion 30'' which is subjected to tensile load in the second state only and forms a loop in the first state. At the module-side end of the tension means 30' at which the bridging portion 30'' is connected to the tension means 30', in the shown embodiment a loop 29 being held in the first state (not shown) by the release device 40 is arranged at the tension means 30'. In the illustrated embodiment, the release device 40 is integrated or arranged in or at the inflator 24. In the first situation (not shown), the loop 29 is held e.g. by a bolt of the release device. In the second situation, the loop 29 and thus the tension means 30' are released by activating the release device, and the packet-like extension 46' can increase the airbag 10 toward the tail of the vehicle and, thus, toward the occupant.

The invention claimed is:

1. A frontal airbag for vehicle occupants, comprising a contact panel facing the vehicle occupant in the inflated state and including an upper edge, a lower edge and two lateral edges, wherein, inside the airbag, tension means which restrain portions of the contact panel in the inflated state of the frontal airbag are arranged at the contact panel so that the contact panel in the mounted and inflated state forms plural indentations extending vertically from the view of the associated occupant, wherein the frontal airbag has a first completely inflated state and a second completely inflated state with a larger airbag volume than in the first state, wherein a release device is assigned to at least several of the tension means and, when the release device is not activated, the frontal airbag only reaches the first state and, when the release device is activated, the contact panel bulges in the area of the released tension means further in the direction of the occupant so as to enable the second state, wherein the plural indentations in the mounted and inflated state which extend vertically from the view of the associated occupant are formed in the first state and in the second state so that even in the second state the contact panel includes plural vertically extending indentations, and wherein the contact panel is composed of plural interconnected strip-shaped cut parts which extend vertically in the inflated state of the frontal airbag, the cut parts being interconnected at the edges thereof, the tension means being disposed in the connection area of the neighboring cut parts.

2. The frontal airbag according to claim 1, wherein the plural indentations and beads formed between the indentations are arranged in the area of the contact panel of the frontal airbag only.

3. The frontal airbag according to claim 1, wherein the release device includes an electrically activatable drive.

4. The frontal airbag according to claim 1, wherein the release device is assigned to plural tension means so as to be capable of releasing them jointly.

5. The frontal airbag according to claim 4, wherein inside the frontal airbag plural tension means starting from the contact panel are combined into one tension means which extends toward the rear side of the airbag and upon which the release device acts.

6. The frontal airbag according to claim 1, wherein at least several of the cut parts extend continuously from the upper edge to the lower edge.

7. The frontal airbag according to claim 1, wherein at least several of the cut parts are fastened to a rear panel in the area of the upper and lower edges.

8. The frontal airbag according to claim 1, wherein edges of the contact panel made from the cut parts are fastened to a front panel and/or to at least one additional panel element.

9. The frontal airbag according to claim 8, wherein the vertically extending indentations in the second state are formed at seams between strip-shaped vertically extending cut parts of the contact panel.

10. The frontal airbag according to claim 1, wherein at least several of the cut parts include an upper end and a lower end which are horizontally narrower than the central area located between the ends, and in that at least several of the cut parts in the central area have bulges facing laterally in opposite directions.

11. The frontal airbag according to claim 1, wherein the contact panel in the inflated and mounted state of the frontal airbag forms, at one of its lateral edges, a vertically extending elongate bead the horizontal width of which is larger than that of the remaining beads formed between neighboring indentations.

12. The frontal airbag according to claim 1, wherein a rear panel in the form of a one-piece cut part is provided.

13. The frontal airbag according to claim 1, wherein at least one tension means has a larger active length after being released and, in the second state, is subjected to tensile load so as to produce at least one indentation at the contact panel.

14. A frontal airbag for vehicle occupants, comprising a contact panel facing the vehicle occupant in the inflated state and including an upper edge, a lower edge and two lateral edges, wherein, inside the airbag, tension means which restrain portions of the contact panel in the inflated state of the frontal airbag are arranged at the contact panel so that the contact panel in the mounted and inflated state forms plural indentations extending vertically from the view of the associated occupant, wherein the frontal airbag has a first completely inflated state and a second completely inflated state with a larger airbag volume than in the first state, wherein a release device is assigned to at least several of the tension means and, when the release device is not activated, the frontal airbag only reaches the first state and, when the release device is activated, the contact panel bulges in the area of the released tension means further in the direction of the occupant so as to enable the second state, wherein the plural indentations in the mounted and inflated state which extend vertically from the view of the associated occupant are formed in the first state and in the second state so that even in the second state the contact panel includes plural vertically extending indentations, wherein the release device is assigned to plural tension means so as to be capable of releasing them jointly, and wherein inside the frontal airbag plural tension means starting from the contact panel are combined into one tension means which extends toward the rear side of the airbag and upon which the release device acts.

15. The frontal airbag according to claim 14, wherein the plural indentations and beads formed between the indentations are arranged in the area of the contact panel of the frontal airbag only.

16. The frontal airbag according to claim 14, wherein the release device includes an electrically activatable drive.

17. The frontal airbag according to claim 14, wherein the contact panel is composed of plural interconnected strip-shaped cut parts which extend vertically in the inflated state of the frontal airbag, the cut parts being interconnected at the edges thereof.

18. The frontal airbag according to claim 17, wherein at least several of the cut parts extend continuously from the upper edge to the lower edge.

19. The frontal airbag according to claim 17, wherein at least several of the cut parts are fastened to a rear panel in the area of the upper and lower edges.

20. The frontal airbag according to claim 17, wherein edges of the contact panel made from the cut parts are fastened to a front panel and/or to at least one additional panel element.

21. The frontal airbag according to claim 17, wherein at least several of the cut parts include an upper end and a lower end which are horizontally narrower than the central area located between the ends, and in that at least several of the cut parts in the central area have bulges facing laterally in opposite directions.

22. The frontal airbag according to claim 21, wherein the vertically extending indentations in the second state are formed at seams between strip-shaped vertically extending cut parts of the contact panel.

23. The frontal airbag according to claim 14, wherein the contact panel in the inflated and mounted state of the frontal airbag forms, at one of its lateral edges, a vertically extending elongate bead the horizontal width of which is larger than that of the remaining beads formed between neighboring indentations.

24. The frontal airbag according to claim 14, wherein a rear panel in the form of a one-piece cut part is provided.

25. The frontal airbag according to claim 14, wherein the one tension means has a larger active length after being released and, in the second state, is subjected to tensile load so as to produce at least one indentation at the contact panel.

* * * * *